United States Patent
Chang et al.

(10) Patent No.: US 9,395,865 B2
(45) Date of Patent: *Jul. 19, 2016

(54) SYSTEMS, METHODS, AND GRAPHICAL USER INTERFACES FOR CONCURRENT DISPLAY OF REPLY MESSAGE AND MULTIPLE RESPONSE OPTIONS

(71) Applicant: GOOGLE INC., Mountain View, CA (US)

(72) Inventors: Bay-Wei Chang, Mountain View, CA (US); Jing Yee Lim, Mountain View, CA (US); Sanjeev Singh, South San Francisco, CA (US)

(73) Assignee: Google Inc., Mountain View, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/727,493

(22) Filed: Dec. 26, 2012

(65) Prior Publication Data

US 2013/0117691 A1 May 9, 2013

Related U.S. Application Data

(60) Continuation of application No. 13/221,825, filed on Aug. 30, 2011, now Pat. No. 8,346,859, which is a continuation of application No. 11/961,911, filed on Dec. 20, 2007, now Pat. No. 8,010,599, which is a (Continued)

(51) Int. Cl.
*G06Q 10/10* (2012.01)
*G06F 3/048* (2013.01)
*H04L 12/58* (2006.01)

(52) U.S. Cl.
CPC .............. *G06F 3/048* (2013.01); *G06Q 10/10* (2013.01); *G06Q 10/107* (2013.01); *H04L 51/00* (2013.01)

(58) Field of Classification Search
CPC ...... G06Q 10/10; G06Q 10/107; G06F 3/048; H04L 51/00

USPC ........................................................ 715/752
See application file for complete search history.

(56) References Cited

U.S. PATENT DOCUMENTS 5,208,748 A 5/1993 Flores et al.
5,216,603 A 6/1993 Flores et al.
(Continued)

FOREIGN PATENT DOCUMENTS

CN 1347530 A 5/2002
CN 1360782 A 7/2002
(Continued)

OTHER PUBLICATIONS

Bitmap Index, Internet Citation, en.wikipedia.org/wiki/Bitmap_index, 05OCT2010, 5 pgs.

(Continued)

*Primary Examiner* — Aaron Lowenberger
(74) *Attorney, Agent, or Firm* — Morgan, Lewis & Bockius LLP

(57) ABSTRACT

Systems, methods, and graphical user interfaces for concurrent display of a reply message and two or more response options are disclosed. In some implementations, a method includes, at a computer, maintaining the display of a reply message associated with a plurality of response options. Each respective response option in the plurality of response options is independently associated with one or more recipient addresses for the reply message. While maintaining the display of at least a portion of the reply message, at least one recipient address for the reply message is updated in accordance with a selected response option. In some implementations, the maintaining of the display of at least a portion of the reply message includes maintaining the display of at least a portion of a message body of the reply message. In some embodiments, the selected response option is one of: reply, reply to all, and forward.

14 Claims, 13 Drawing Sheets

Related U.S. Application Data continuation of application No. 11/522,549, filed on Sep. 13, 2006, now Pat. No. 7,315,880, which is a division of application No. 10/815,284, filed on Mar. 31, 2004, now Pat. No. 7,269,621.

(56) References Cited

U.S. PATENT DOCUMENTS

| | | |
|---|---|---|
| 5,479,408 A | 12/1995 | Will |
| 5,613,108 A | 3/1997 | Morikawa |
| 5,724,571 A | 3/1998 | Woods |
| 5,734,837 A | 3/1998 | Flores et al. |
| 5,740,549 A | 4/1998 | Reilly et al. |
| 5,761,689 A | 6/1998 | Rayson et al. |
| 5,832,502 A | 11/1998 | Durham et al. |
| 5,872,925 A | 2/1999 | Han |
| 5,905,863 A | 5/1999 | Knowles et al. |
| 5,913,040 A | 6/1999 | Rakavy et al. |
| 5,948,058 A | 9/1999 | Kudoh et al. |
| 5,959,621 A | 9/1999 | Nawaz et al. |
| 6,021,427 A | 2/2000 | Spagna et al. |
| 6,029,164 A | 2/2000 | Birrell et al. |
| 6,029,195 A | 2/2000 | Herz |
| 6,085,206 A | 7/2000 | Domini et al. |
| 6,151,596 A | 11/2000 | Hosomi |
| 6,182,063 B1 | 1/2001 | Woods |
| 6,182,098 B1 | 1/2001 | Selker |
| 6,185,551 B1 | 2/2001 | Birrell et al. |
| 6,330,589 B1 | 12/2001 | Kennedy |
| 6,350,066 B1 | 2/2002 | Bobo, II |
| 6,396,513 B1 | 5/2002 | Helfman et al. |
| 6,408,297 B1 | 6/2002 | Ohashi |
| 6,421,694 B1 | 7/2002 | Nawaz et al. |
| 6,438,564 B1 | 8/2002 | Morton et al. |
| 6,493,702 B1 | 12/2002 | Adar et al. |
| 6,493,703 B1 | 12/2002 | Knight et al. |
| 6,507,351 B1 | 1/2003 | Bixler |
| 6,549,957 B1 | 4/2003 | Hanson et al. |
| 6,594,658 B2 | 7/2003 | Woods |
| 6,594,693 B1 | 7/2003 | Borwankar |
| 6,606,644 B1 | 8/2003 | Ford et al. |
| 6,615,241 B1 | 9/2003 | Miller et al. |
| 6,640,239 B1 | 10/2003 | Gidwani |
| 6,665,668 B1 | 12/2003 | Sugaya et al. |
| 6,683,627 B1 | 1/2004 | Ullmann et al. |
| 6,708,205 B2 | 3/2004 | Sheldon et al. |
| 6,725,228 B1 | 4/2004 | Clark et al. |
| 6,742,042 B1 | 5/2004 | Holden et al. |
| 6,745,197 B2 | 6/2004 | McDonald |
| 6,757,889 B1 | 6/2004 | Ito |
| 6,771,291 B1 | 8/2004 | DiStefano, III |
| 6,785,869 B1 | 8/2004 | Berstis |
| 6,820,081 B1 | 11/2004 | Kawai et al. |
| 6,826,596 B1 | 11/2004 | Suzuki |
| 6,834,276 B1 | 12/2004 | Jensen et al. |
| 6,889,361 B1 | 5/2005 | Bates et al. |
| 6,892,196 B1 | 5/2005 | Hughes |
| 6,973,481 B2 * | 12/2005 | MacIntosh et al. ........... 709/206 |
| 7,010,616 B2 | 3/2006 | Carlson et al. |
| 7,017,173 B1 | 3/2006 | Armstrong et al. |
| 7,035,903 B1 | 4/2006 | Baldonado |
| 7,043,690 B1 | 5/2006 | Bates et al. |
| 7,069,300 B2 | 6/2006 | Toyota et al. |
| 7,089,278 B1 | 8/2006 | Churchill et al. |
| 7,107,544 B1 | 9/2006 | Luke |
| 7,120,668 B2 | 10/2006 | Manber et al. |
| 7,139,850 B2 | 11/2006 | Amemiya et al. |
| 7,143,135 B2 | 11/2006 | Smith et al. |
| 7,171,429 B2 | 1/2007 | Frieden et al. |
| 7,206,388 B2 | 4/2007 | Diacakis |
| 7,213,210 B2 | 5/2007 | Reysa |
| 7,222,299 B1 | 5/2007 | Lim et al. |
| 7,328,242 B1 | 2/2008 | McCarthy et al. |
| 7,340,674 B2 | 3/2008 | Newman |
| 7,356,772 B2 | 4/2008 | Brownholtz et al. |
| 7,359,936 B2 | 4/2008 | Gruen et al. |
| 7,383,250 B2 | 6/2008 | Scian et al. |
| 7,383,307 B2 | 6/2008 | Kirkland et al. |
| 7,386,439 B1 | 6/2008 | Charnock et al. |
| 7,412,437 B2 | 8/2008 | Moody et al. |
| 7,421,690 B2 | 9/2008 | Forstall et al. |
| 7,433,920 B2 | 10/2008 | Blagsvedt et al. |
| 7,472,357 B1 | 12/2008 | Satterfield et al. |
| 7,484,175 B2 | 1/2009 | Kirkland |
| 7,505,759 B1 | 3/2009 | Rahman |
| 7,523,222 B2 | 4/2009 | Carlson |
| 7,565,347 B2 | 7/2009 | Broder et al. |
| 7,565,534 B2 | 7/2009 | Starbuck et al. |
| 7,593,995 B1 | 9/2009 | He et al. |
| 7,596,594 B2 | 9/2009 | Karp |
| 7,599,852 B2 | 10/2009 | Bosarge et al. |
| 7,693,866 B1 | 4/2010 | Weaver et al. |
| 7,716,593 B2 | 5/2010 | Durazo et al. |
| 7,730,113 B1 | 6/2010 | Payette et al. |
| 7,788,326 B2 | 8/2010 | Buchheit et al. |
| 7,814,155 B2 | 10/2010 | Buchheit et al. |
| 7,818,378 B2 | 10/2010 | Buchheit et al. |
| 7,899,871 B1 | 3/2011 | Kumar et al. |
| 7,904,510 B2 | 3/2011 | Anderson et al. |
| 7,912,904 B2 | 3/2011 | Buchheit et al. |
| 7,962,508 B2 | 6/2011 | Moody et al. |
| 8,265,670 B2 | 9/2012 | Yasuda et al. |
| 8,601,062 B2 | 12/2013 | Buchheit et al. |
| 2001/0016845 A1 | 8/2001 | Tribbensee |
| 2001/0042100 A1 | 11/2001 | Guedalia et al. |
| 2001/0047294 A1 | 11/2001 | Rothschild |
| 2002/0010775 A1 | 1/2002 | Rakavy et al. |
| 2002/0049610 A1 * | 4/2002 | Gropper ........................... 705/1 |
| 2002/0073156 A1 | 6/2002 | Newman |
| 2002/0087649 A1 | 7/2002 | Horvitz |
| 2002/0093527 A1 * | 7/2002 | Sherlock et al. ............... 345/736 |
| 2002/0108125 A1 | 8/2002 | Joao |
| 2002/0169841 A1 | 11/2002 | Carlson et al. |
| 2002/0188683 A1 | 12/2002 | Lytle et al. |
| 2002/0194229 A1 | 12/2002 | Decime et al. |
| 2003/0009385 A1 | 1/2003 | Tucciarone et al. |
| 2003/0020749 A1 | 1/2003 | Abu-Hakima et al. |
| 2003/0037339 A1 | 2/2003 | Lee |
| 2003/0055711 A1 | 3/2003 | Doherty |
| 2003/0093315 A1 | 5/2003 | Sato |
| 2003/0101065 A1 | 5/2003 | Rohall et al. |
| 2003/0110227 A1 | 6/2003 | O'Hagan |
| 2003/0120737 A1 | 6/2003 | Lytle et al. |
| 2003/0135555 A1 | 7/2003 | Birrel et al. |
| 2003/0145285 A1 | 7/2003 | Miyahira et al. |
| 2003/0158903 A1 | 8/2003 | Rohall et al. |
| 2003/0163537 A1 | 8/2003 | Rohall et al. |
| 2003/0167310 A1 | 9/2003 | Moody et al. |
| 2003/0177190 A1 | 9/2003 | Moody et al. |
| 2003/0229607 A1 | 12/2003 | Zellweger et al. |
| 2003/0233419 A1 | 12/2003 | Beringer |
| 2004/0015553 A1 | 1/2004 | Griffin et al. |
| 2004/0044735 A1 | 3/2004 | Hoblit |
| 2004/0054737 A1 | 3/2004 | Daniell |
| 2004/0059712 A1 | 3/2004 | Dean et al. |
| 2004/0073616 A1 | 4/2004 | Fellenstein |
| 2004/0078432 A1 | 4/2004 | Manber et al. |
| 2004/0083265 A1 | 4/2004 | Beringer |
| 2004/0098488 A1 | 5/2004 | Mayers |
| 2004/0117448 A1 | 6/2004 | Newman et al. |
| 2004/0133564 A1 | 7/2004 | Gross et al. |
| 2004/0153509 A1 | 8/2004 | Alcorn et al. |
| 2004/0186766 A1 | 9/2004 | Fellenstein et al. |
| 2004/0199589 A1 | 10/2004 | Keohane et al. |
| 2004/0205141 A1 | 10/2004 | Goland |
| 2004/0210587 A1 | 10/2004 | Reysa |
| 2004/0260710 A1 | 12/2004 | Marston et al. |
| 2004/0260756 A1 | 12/2004 | Forstall et al. |
| 2004/0267700 A1 | 12/2004 | Dumais et al. |
| 2005/0004990 A1 | 1/2005 | Durazo et al. |
| 2005/0060643 A1 | 3/2005 | Glass et al. |
| 2005/0080859 A1 | 4/2005 | Lake |
| 2005/0086096 A1 | 4/2005 | Bryant |
| 2005/0086598 A1 | 4/2005 | Marshall, III et al. |

(56) References Cited

U.S. PATENT DOCUMENTS

| | | |
|---|---|---|
| 2005/0091318 A1* | 4/2005 | Keohane et al. ............. 709/206 |
| 2005/0091320 A1 | 4/2005 | Kirsch et al. |
| 2005/0108345 A1 | 5/2005 | Suzuki |
| 2005/0114781 A1 | 5/2005 | Brownholtz et al. |
| 2005/0138002 A1 | 6/2005 | Giacobbe et al. |
| 2005/0138552 A1 | 6/2005 | Venolia |
| 2005/0144157 A1 | 6/2005 | Moody et al. |
| 2005/0144241 A1 | 6/2005 | Stata et al. |
| 2005/0198172 A1 | 9/2005 | Appelman et al. |
| 2005/0198173 A1 | 9/2005 | Evans |
| 2005/0198256 A1 | 9/2005 | Moody et al. |
| 2005/0204009 A1 | 9/2005 | Hazarika et al. |
| 2005/0223057 A1 | 10/2005 | Buchheit et al. |
| 2005/0223061 A1 | 10/2005 | Auerbach et al. |
| 2005/0223066 A1 | 10/2005 | Buchheit et al. |
| 2005/0223067 A1 | 10/2005 | Buchheit et al. |
| 2005/0223072 A1 | 10/2005 | Greve et al. |
| 2005/0234848 A1 | 10/2005 | Lawrence et al. |
| 2005/0289468 A1 | 12/2005 | Kahn et al. |
| 2006/0026593 A1 | 2/2006 | Canning et al. |
| 2006/0031303 A1 | 2/2006 | Pang |
| 2006/0031304 A1 | 2/2006 | Bagga et al. |
| 2006/0085502 A1 | 4/2006 | Sundararajan et al. |
| 2006/0123091 A1 | 6/2006 | Ho |
| 2006/0128404 A1 | 6/2006 | Klassen et al. |
| 2006/0168067 A1 | 7/2006 | Carlson et al. |
| 2006/0248209 A1 | 11/2006 | Chiu et al. |
| 2006/0271630 A1 | 11/2006 | Bensky et al. |
| 2007/0038707 A1 | 2/2007 | Broder et al. |
| 2007/0047697 A1 | 3/2007 | Drewry et al. |
| 2007/0060206 A1 | 3/2007 | Dam Nielsen et al. |
| 2007/0067404 A1 | 3/2007 | Brown et al. |
| 2007/0143411 A1 | 6/2007 | Costea et al. |
| 2007/0143428 A1 | 6/2007 | Kumar et al. |
| 2007/0198639 A1 | 8/2007 | Litwin et al. |
| 2007/0255791 A1 | 11/2007 | Bodlaender et al. |
| 2007/0300153 A1 | 12/2007 | Newman et al. |
| 2008/0091656 A1 | 4/2008 | Charnock et al. |
| 2008/0147815 A1 | 6/2008 | Damm et al. |
| 2008/0281813 A1 | 11/2008 | Moody et al. |
| 2008/0313292 A1 | 12/2008 | Forstall et al. |
| 2009/0030774 A1 | 1/2009 | Rothschild et al. |
| 2009/0089292 A1 | 4/2009 | Cheah |
| 2010/0030798 A1 | 2/2010 | Kumar et al. |
| 2010/0064017 A1 | 3/2010 | Buchheit et al. |
| 2010/0070584 A1 | 3/2010 | Chen et al. |
| 2010/0241700 A1 | 9/2010 | Rasmussen et al. |
| 2010/0318555 A1 | 12/2010 | Broder et al. |
| 2011/0035681 A1 | 2/2011 | Mandel et al. |
| 2011/0153585 A1 | 6/2011 | Ramamurthi |
| 2011/0161270 A1 | 6/2011 | Arnett et al. |
| 2011/0225249 A1 | 9/2011 | Forstall et al. |
| 2011/0264750 A1 | 10/2011 | Fabre et al. |
| 2012/0185797 A1 | 7/2012 | Thorsen et al. |
| 2012/0209853 A1 | 8/2012 | Desai et al. |
| 2012/0296891 A1 | 11/2012 | Rangan |

FOREIGN PATENT DOCUMENTS

| | | | |
|---|---|---|---|
| CN | 1402159 | A | 3/2003 |
| CN | 1429376 | A | 7/2003 |
| CN | 1438595 | A | 8/2003 |
| CN | 1464458 | A | 12/2003 |
| EP | 0886228 | A2 | 12/1998 |
| GB | 2369218 | A | 5/2002 |
| JP | 09-128407 | A | 5/1997 |
| JP | 11-015763 | | 1/1999 |
| JP | 2000-187631 | | 7/2000 |
| JP | 2000-276474 | | 10/2000 |
| JP | 2001-222477 | A | 8/2001 |
| JP | 2002-014903 | | 1/2002 |
| JP | 2002-359667 | A | 12/2002 |
| JP | 2003-030216 | A | 1/2003 |
| JP | 2003-067306 | | 3/2003 |
| JP | 2003-108278 | A | 4/2003 |
| JP | 2004-054614 | | 2/2004 |
| JP | 2004-173124 | | 6/2004 |
| JP | 2005-536790 | A | 12/2005 |
| WO | WO 00/23931 | A2 | 4/2000 |
| WO | WO 01/61551 | A1 | 8/2001 |
| WO | WO 03/058519 | A2 | 7/2003 |
| WO | WO 03/067497 | A1 | 8/2003 |
| WO | 2010/0241749 | | 9/2010 |

OTHER PUBLICATIONS

Google Inc., Decision to Grant a Patent, JP 2011-181202, Mar. 7, 2013, 1 pg.
Google Inc., Decision to Grant a Patent, JP 2011-181203, Mar. 11, 2013, 1 pg.
Google Inc., Decision to Grant a Patent, JP 2011-181204, Mar. 11, 2013, 1 pg.
Google Inc., Extended European Search Report, EP 12192299.1, Mar. 6, 2013, 7 pgs.
Google Inc., ISR/WO, PCT/US2012/046876, Feb. 22, 2013, 12 pgs.
Google Inc., Notice of Acceptance, AU 2011201989, Oct. 27, 2012, 3 pgs.
Google Inc., Notice of Acceptance, AU 2011201993, Mar. 21, 2013, 3 pgs.
Google Inc., Office Action, JP 2011-181205, Mar. 11, 2013, 4 pgs.
Navarro, Indexing and Searching, Modern Information Retrieval, Ch. 8, Jan. 1, 1999, pp. 191-228.
Ogilvie, Experiments with Language Models for Known-Item Finding of Email Messages, TREC 2005, Nov. 15-18, 2005, 10 pgs.
About Microsoft Word screen shot, May 28, 2007, 1 pg.
Apple Computer Inc, Mail 1.3.3 Help: Checking Spelling in Email, Aug. 31, 2004, 1 pg.
Apple Computer Inc., Mac mail utility screenshot, Aug. 18, 2004, 1 pg.
Bellotti, Taking Email to Task; the design and evaluation of a task management centered email tool, Apr. 5-10, 2003, 8 pgs.
Bellotti, Taskmaster: recasting email as task management, Feb. 2, 2009, 5 pgs.
Comer, Conversation-based Mail, Nov. 1986, 21 pgs.
Courter, Mastering Microsoft Office 2000—Professional Edition, p. 5.
Courter, Mastering Microsoft Office 2000—Professional Edition, pp. 36-37 and 92-94.
Elsas, Retrieval and Feedback Models for Blog Feed Search, SIGIR '08, Jan. 1, 2008, 8 pgs.
Flores, Computer Systems and the Design of Organizational Interaction, Apr. 1988, 20 pgs.
Google Inc., ISR/WO, PCT/US2012/046872, Sep. 28, 2012, 11 pgs.
Google Inc., European Search Report, EP 11172427.4, Dec. 21, 2011, 6 pgs.
Google Inc., ESR, EP 12183097.0, Nov. 5, 2012, 7 pgs.
Google Inc., ESR, EP 12183103.6, Nov. 5, 2012, 7 pgs.
Google Inc., IPRP, PCT/US2005/006826, Oct. 4, 2006, 4 pgs.
Google Inc., ISR/WO, PCT/US2005/006826, Jun. 26, 2006, 7 pgs.
Google Inc., ISR/WO, PCT/US2005/010137, Jun. 3, 2005, 11 pgs.
Google Inc., Notice of Acceptance, AU 2011203058, Jan. 6, 2012, 3 pgs.
Google Inc., Office Action, AU 2011201989, Apr. 12, 2012, 3 pgs.
Google Inc., Office Action, AU 2011201991, Mar. 8, 2012, 2 pgs.
Google Inc., Office Action, AU 2011201992, Aug. 16, 2012, 3 pgs.
Google Inc., Office Action, AU 2011201993, Oct. 11, 2012, 3 pgs.
Google Inc., Office Action, AU 2011201993, Feb. 28, 2012, 2 pgs.
Google Inc., Office Action, AU 2011201994, Mar. 8, 2012, 2 pgs.
Google Inc., Office Action, AU 2011203058, Oct. 31, 2011, 1 pg.
Google Inc., Office Action, CN 200580016413.8, Jul. 2, 2012, 3 pgs.
Google Inc., Office Action, CN 200580016413.8, Dec. 19, 2011, 3 pgs.
Google Inc., Office Action, EP 05724384.2, Nov. 23, 2012, 7 pgs.
Google Inc., Office Action, IN 1262/MUMNP/2006, Sep. 27, 2011, 4 pgs.
Google Inc., office Action, JP 2010-275595, Jul. 6, 2012, 4 pgs.
Google Inc., Office Action, JP 2011-181202, Aug. 29, 2012, 3 pgs.
Google Inc., Office Action, JP 2011-181203, Aug. 27, 2012, 3 pgs.

(56) References Cited

OTHER PUBLICATIONS

Google Inc., Office Action, JP 2011-181204, Aug. 27, 2012, 3 pgs.
Google Inc., Office Action, JP 2011-181205, Aug. 29, 2012, 4 pgs.
Google Inc., Office Action, KR 2006-7022840, Jan. 26, 2012, 4 pgs.
Google Inc., Office Action, KR 2011-7017094, Sep. 26, 2011, 5 pgs.
Google Inc., Office Action, KR 2011-7017095, Sep. 29, 2011, 5 pgs.
Google Inc., Office Action, KR 2011-7017096, Oct. 4, 2011, 4 pgs.
Google Inc., Office Action, KR 2011-7017098, Oct. 4, 2011, 3 pgs.
Google Inc., Office Action, KR 2011-7017102, Oct. 4, 2011, 4 pgs.
Lawrence, Context and page analysis for improved web search, Oct. 31, 1998, 9 pgs.
Lin, Modeling Semantics and Structure of Discussion Threads, WWW'09, Jan. 1, 2009, 1 pg.
O'Hara, Easy Microsoft Office Outlook 2003, Sep. 18, 2003, 44 pgs.
Resnick, Network Working Group, RFC 2822, Apr. 2011, 65 pgs.
Russel, Special Edition Using Microsoft Office Outlook 2003, Sep. 25, 2003, 102 pgs.
Screenshot of reply to message in Lotus Notes 6.5, Aug. 6, 2007, 1 pg.
Seo, Online Community Search Using Conversational Structures, V14, N6, Apr. 23, 2011, 25 pgs.
Shepherd, Strudel-an extensiBle electronic conversation toolkit, Oct. 1990, 12 pgs.
Syroid, Outlook 2000 in a Nutshell, O'Reilly, May 2, 2000, pp. 1-66.
Tobias, Dan's Mail Format Site, Aug. 3, 2003, 6 pgs.
Tyson, Sams Teach Yourself Microsoft Outlook 2000 in 24 Hours, 1999, pp. 237.
Venolia, Supporting Email Workflow, Sep. 2001, 11 pgs.
Winograd, A Language/Action Perspective on the Design of Cooperative Work, 1987-1988, pp. 3-30.
Winograd, Where the Action is, Dec. 1998, 5 pgs.
Zawinski, Message Threading, Jul. 22, 2004, 9 pgs. http://www.jwz.org/doc/threading.html.
Giacoletto, Automatic Expansion of Manual Email Classifications Based on Text Analysis, Lecture Notes in Computer Science, Springer, vol. 2888, 2003, pp. 785-802.
Google Inc., Communication pursuant to Article 94(3) EPC, EP 05730150.9, Nov. 4, 2010, 6 pgs.
Google Inc., International Preliminary Report on Patentability, PCT/US2012/046872, Feb. 6, 2014, 8 pgs.
Google Inc., International Preliminary Report on Patentability, PCT/US2012/046876, Feb. 6, 2014, 9 pgs.
Google Inc., Notice of Acceptance, AU 2011201992, Oct. 31, 2012, 3 pgs.
Google Inc., Requisition by the Examiner, CA 2,561,580, Jul. 12, 2013, 4 pgs.
Google Inc., Requisition by the Examiner, CA 2,561,580, Oct. 12, 2010, 1 pg.
Gruen, Lessons from the reMail prototypes, CSCW '04, ACM, New York, NY, 2004, pp. 152-161.
Kerr, Designing remail: reinventing the email client through innovation and integration, CHI '04, ACM, New York, NY, 2004, pp. 837-852.
McWherter, Software architecture to facilitate automated message recording and context annotation, SPIE 4208, Dec. 29, 2000, pp. 122.
Quan, A Unified Abstraction for Messaging on the Semantic Web, WWW 2003, 2003, pp. 231.
Samiel, EzMail: using informmation visualization techniques to help manage email, IV 2004, Jul. 14-16, 2004, pp. 477-482.
Shrestha, Detection of question-answer pairs in email conversations, COLING '04, Stroudsburg, PA, 2004, Article 889.
Rohall, Email Visualizations to Aid Communications, IEEE Symposium on Information Visualization (InfoVis), 2001, p. 1-4.
Venolia, Understanding Sequence and Replay Relationships within Email Conversations: A Mixed-Model Visualization, CHI 2003, Ft. Lauderdale FL, Apr. 5-10, 2003, pp. 361-368.
Autonom webpage, http://autonomy.com, 2004, 1 pg.
Cordess, Taking a Look at Zoe, Google Your Email, Apr. 26, 2004, 1 pg.
DolphinSearch webpage, www.dolphinsearch.com, 2004, 1 pg.
eComrnerce Customer Service: Email Management Systems that Work, eGain Corporation White Paper, 1998, 9 pgs.
Enfish webpage, www.enfish.com, 2004, 1 pg.
Flenner, Replace Those Shared Drives With Space Drives, O'Reilly on Java.com, Aug. 28, 2002, 7 pgs.
Friedman, The Dashboard, 2003, 2 pgs.
Gelernter, Expert Voice: David Gelernter on Knowledge Management, Cioinsight, Oct. 10, 2002, 6 pgs.
Google Inc., ISR/WO, PCT/US2005/031920, May 3, 2006, 3 pgs.
Kanellos, Microsoft Aims for Search on Its Own Terms, c/net News.com, Nov. 24, 2003, 4 pgs.
Lotus Discovery Server webpage, lotus.com/product/disecserver.nsf, 2004, 1 pg.
My Take on Dashboard: Multiple Desktops Done Differently, engadgeted.net, Jul. 23, 2004, 2 pgs.
Opera Mail Client, Opera M2 wcbpage, www.opera.com/products/desktop/m2, Jun. 2004, 3 pgs.
Placeless Documents, Xerox Corporation, www2.pare.com/csl/projects/placeless, 1999, 2 pgs.
Searching ZoeDocs, zoe.omara.ca/index.ph?page—searching, Dec. 2003, 3 pgs.
The Apache Jakarta Project, jakarta.apache.org/lucene/docs/indes.htlm, 2004, 1 pg.
Udell, Googling Your Email, O'Reilly Network, Oct. 7, 2002, 4 pgs.
What Does Autonomy Do?, http://www.autonomy.com/content/home, 2003, 5 pgs.
X1 About Us, www.x1.com/abou_us/, 2004, 1 pg.
X1 Enterprise Edition product page, www.x1.com/?PROGOOG, 2004, 2 pgs.
ZoeDocs, http://zoe.omara.ca/LikeZoe, Nov. 2003, 1 pg.
Google Inc., Notice of Reasons for Rejection, JP 2013-113280, Mar. 5, 2014, 3 pgs.
Tefaguchi, Customizing to the limit for an easy to use personal computer, Windows 2000/XP Environment Improving Committee 29th e-mail software part (1), Fully utilizing "Outlook Express", Windows 2000 World, K. K. IDG Japan, Jan. 1, 2013, vol. 8, No. 1, 11 pgs.
Anupam, Personalizing the Web using site descriptions, Proc. 10th Int'l Workshop on Database and Expert Systems Applications, 1999, pp. 732, 738.
Google Inc., Communication pursuant to Article 94(3) EPC, EP 12183097.0, Nov. 11, 2013, 7 pgs.
Google Inc., Communication pursuant to Article 94(3) EPC, EP 12183103.6, Nov. 11, 2013, 7 pgs.
Google Inc., Decision to Grant a Patent, JP 2011-181205, Sep. 6, 2013, 1 pg.
Google Inc., Office Action, CA 2,561,580, Jul. 12, 2013, 4 pgs.
Haas, Personalized news through content augmentation and profiling, Int'l Conf. on Image Processing 2002, vol. 2, pp. II-9,II-12.
Microsoft Corp., Microsoft Outlook 2003, Released Nov. 20, 2003, 4 pgs.
Sudarsky, Visualizing Electronic Mail, Proc. 6th Int'l Conference on Information Visualisation, 2002, pp. 3, 9.
Zelman, Threaded Email Messages in Self-Organization and Science & Technology Studies Oriented Mailing Lists, Kluwer Academic Publishers—Scientometrics, Jul. 1, 2000, vol. 48, Iss. 3, pp. 361-380.
Electronic Discovery Solutions from DolphinSearch, www.dolphinsearch.com, 2003, 1 pg.
Google Inc., First Office Action, CN 201110416451.X, Jun. 24, 2014, 4 pgs.
Google Inc., Office Action, CA 2,561,580, Jul. 29, 2014, 4 pgs.
Google Inc., Supplemental European Search Report, EP 05724384.2, Mar. 16, 2009, 5 pgs.
Liu, Keyword fusion to support efficient keyword-based Cluster Computing and the Grid, 2004, CCGrid search in peer-to-peer file sharing, Apr. 19-22, 2004, pp. 269-276.
Liu, Supporting efficient keyword-based file search in peer-to-peer file sharing systems, Global Telecommunications Conference, 2004, GLOBECOM '04, Nov. 29-Dec. 3, 2004, pp. 1259-1265.
Chan, Co-training with a Single Natural Feature Set Applied to Email Classification, IEEE/WIC/ACM International Conference on Web Intelligence 2004, Sep. 20-24, 2004, pp. 586-589.

(56) References Cited

OTHER PUBLICATIONS

Crespo, Language model adaptation for conversational speech recognition using automatically tagged pseudo-morphological classes, IEEE International Conference on Acoustics, Speech, and Signal Processing, 1997, pp. 823-826.

Henry, Off-the-record email system, 20th Annual Joint Conference of the IEEE Computer and Communications Societies, vol. 2, 2001, p. 869-877.

Kaushik, A policy driven approach to email services, 5th IEEE International Workshop on Policies for Distributed Systems and Networks, Policy 2004, Jun. 7-9, 2004, pp. 169-178.

Kerr, Thread Arcs: an email thread visualization, IEEE Symposium on Information Visualization 2003, Oct. 21, 2003, pp. 211-218.

Donath, Visualizing Conversation, J. Computer-Mediated Communication, vol. 4, Iss. 4, Blackwell Publishing, Jun. 1999, 18 pgs.

Google Inc., Notice of Reasons for Rejection, JP 2014-112132, Apr. 28, 2015, 3 pgs.

Google Inc., Office Action, CA 2,561,580, Jul. 13, 2015, 8 pgs.

Google Inc., Office Action, CN 201110416439.9, May 29, 2015, 6 pgs.

Google Inc., Patent Examination Report No. 1, AU 2013205898, Jun. 26, 2015, 3 pgs.

Google Inc., Second Office Action, CN 201110416451.X, May 14, 2015, 3 pgs.

Google Inc., Second Office Action, CN 201110416455.8, May 7, 2015, 4 pgs.

Google Inc., Second Office Action, CN 201110416787.6, May 7, 2015, 4 pgs.

Shigekazu, Practice Course of E-mail (4) Managing received mails, Touch PC, Japan, Mainichi Communications Inc., Mar. 24, 1999, vol. 4, No. 4, pp. 96-98 <<No. English version available>>.

Google Inc., Decision of Rejection, CN 201110416451.X, Dec. 23, 2015, 5 pgs.

Google Inc., First Office Action, CN 201110416455.8, Dec. 14, 2015, 3 pgs.

Google Inc., Notification of the Third Office Action, CN Patent Application 201110416787.6, Dec. 11, 2015, 3 pgs.

Google Inc., Notification of the Third Office Action, CN 201110416439.9, Feb. 5, 2016, 4 pgs.

* cited by examiner

From: Client A
To: Client B
Cc: Client C
Subject: Dinner

What time should we meet for dinner?

Reply

From: Client C
To: Client A, Client B
Subject: re: Dinner

How about 7:00? Where should we meet?

Reply

From: Client B
To: Client A
Subject: re: Dinner

7:00 works for me. Lets meet at the corner of Main and Washington.

Reply

From: Client B
To: Client A
Subject: re: Dinner

Are you working today?

Reply

700

```
710
Providing a reply form for responding to
a first electronic mail message
```

```
720
Providing a plurality of response options
```

```
730
Detecting a selection of one of the
plurality of response options
```

```
740
Dynamically updating the recipient addresses
of the response message in response to the selected
response option
```

Figure 7

SYSTEMS, METHODS, AND GRAPHICAL USER INTERFACES FOR CONCURRENT DISPLAY OF REPLY MESSAGE AND MULTIPLE RESPONSE OPTIONS

RELATED APPLICATIONS

This application is a continuation of and claims priority to U.S. patent application Ser. No. 13/221,825, filed Aug. 30, 2011, which is a continuation of U.S. patent application Ser. No. 11/961,911, filed Dec. 20, 2007, now U.S. Pat. No. 8,010, 599, which is a continuation of U.S. patent application Ser. No. 11/522,549, filed Sep. 13, 2006, now U.S. Pat. No. 7,315, 880, which is a divisional of U.S. patent application Ser. No. 10/815,284, filed Mar. 31, 2004, now U.S. Pat. No. 7,269,621. All above-referenced U.S. Patent Applications and Patents are hereby incorporated by reference herein in their entireties.

TECHNICAL FIELD

The present disclosure relates generally to Internet technology, and more particularly, to electronic mail (email) technology.

BACKGROUND

The importance of email technology in society today is well known. Email applications have become a common tool in both business and personal communication. A significant factor in the widespread adoption of email technology is the relative ease with which individuals may communicate using email. An individual may quickly communicate a message to one or more individuals by simply inputting the message and the recipients' email address into an email application and clicking a mouse button. One of the primary reasons email is so attractive is that the messages are typically delivered within seconds of being sent.

FIG. 1 illustrates an exemplary network on which email messaging may occur. As shown, each of the computer clients, Client A 120, Client B 121, Client C 122, and Client D 123, is coupled to a network 100. This network may be a private network, a public network such as the Internet, or a combination thereof. The computer clients (120, 121, 122, 123) are able to communicate with each other through virtual connections over network 100. These virtual connections allow the clients (120, 121, 122 and 123) to send and receive electronic mail messages from the other clients.

Many email users access their email through web mail applications which display a user's email inbox and the corresponding email messages in a web page environment. One of the advantages of web mail applications is that the user may access their email from any location that provides access to the World Wide Web. When a user logs into their email account, they are typically presented with an inbox view that provides a list of the various email messages the user has received. When the user selects a particular email message, for example, by clicking on the message within the list, a request is sent to a web server requesting the selected message. The server responds with the email message which is displayed to the user as a new web page.

Typically, the web page displaying the message includes one or more reply options. Examples of response options include Reply, Reply-to-All and Forward. These response options are usually presented to the user as links or buttons that the user may select. Reply allows the user to reply to the originator of the message. Reply-to-All allows the user to reply to all of the recipients of the message. The Forward option allows the user to forward the email to a user who was not one of the original recipients of the message.

When a user selects one of the response options in a web based email application, a request is sent to a remote email server requesting the reply web page corresponding to the selected response option. This page typically includes a text box for inputting the reply message and one or more address fields for inserting the recipient addresses. When the user selects the Reply or Reply-to-All option, the server typically inserts the appropriate recipient address information into the address fields.

Typically, a user must choose the response option at the time he decides to respond to the email. If the user later changes his mind and wants to select a different response option, he cannot do so from the reply web page returned by the server. In order to select a different response option, the user would have to return to the original message web page. This process may result in multiple requests to the server which increases web traffic and adds additional latency to the user experience. If the user provides part or all of a response message into the reply web page before changing his mind on the response options, the user would lose the message unless he copied the message before returning to the original message and pasted it into the new reply web page returned by the server upon selecting the new response option.

These same limitations are also present in client-side email applications such as Microsoft Outlook. When the user selects a particular response option, a new message window is created including the recipient addresses associated with the response option. However, if the user wishes to change to a different response option, the user must close the window and select a different response option. These applications do not provide the user with a mechanism to dynamically change the response option for his message. As a result, if the user has provided part or all of a message prior to deciding to select a different response option, the user must either copy the message and paste it into the new reply window, or must manually enter the additional recipient addresses.

Accordingly, what is desirable are improved systems and methods for addressing the above-described limitations of prior systems.

SUMMARY

The present disclosure provides a system, a graphical user interface, and a method for dynamically updating the recipient email addresses of a response message in response to a user selection of a response option.

In some embodiments, a method includes: at a computer: maintaining display of a reply message associated with a plurality of response options, where each response option in the plurality of response options is associated with one or more recipient addresses for the reply message. While maintaining the display of at least a portion of the reply message, at least one recipient address for the reply message is updated in accordance with a selected response option.

In some embodiments, maintaining the display of at least a portion of the reply message includes maintaining display of at least a portion of a message body of the reply message. In some embodiments, the selected response option is one of: reply, reply to all, and forward. In some embodiments, the at least one recipient address is updated without requesting a new reply form. In some embodiments, the reply message and the at least one recipient address are displayed in a first reply form.

In some embodiments, the method further includes displaying a tear-off mechanism and, responsive to a user selection of the tear-off mechanism, displaying a second reply form separately from the first reply form. This second reply form includes the plurality of response options and a portion of the reply message. In some embodiments, the second reply form further includes an option to edit the at least one recipient address for the reply message.

BRIEF DESCRIPTION OF THE DRAWINGS

For a better understanding of the aforementioned aspects of the present disclosure as well as additional aspects and embodiments thereof, reference should be made to the Description of Embodiments below, in conjunction with the following drawings in which like reference numerals refer to corresponding parts throughout the figures.

FIG. 6B illustrates an email thread 500 with an inserted response message according to one embodiment of the present disclosure.

FIG. 7 is a flowchart for updating the recipient addresses of a response email in response to user selection of a response option according to one embodiment of the present disclosure.

DESCRIPTION OF EMBODIMENTS

An apparatus and method for dynamically updating at least one email transmission characteristic of a reply form without modifying the text message within the reply form is described. Email transmission characteristics include but are not limited to the recipient addresses of the response message, security parameters, quality of service characteristics or the priority level assigned to the response message. One skilled in the art will recognize that there are a number of email transmission characteristics that may be modified according to the present disclosure.

In one embodiment, the recipient addresses of a response message may be dynamically updated in response to a user selection of one of a plurality of response options. In one embodiment, a reply form associated with a received email message may be displayed to a user. The reply form may include multiple response options, a text box for inputting the response message and one or more address fields for adding and or editing the email addresses of the intended recipients of the response message. In response to a user selection of a response option, the recipient addresses of the response message may be dynamically populated based upon the selected response option.

In the following description, for purposes of explanation, specific details are set forth in order to provide an understanding of the present disclosure. It will be apparent, however, to one skilled in the art that the present disclosure can be practiced without these details. Furthermore, one skilled in the art will recognize that embodiments of the present disclosure, exemplary ones of which are described below, may be utilized in any electronic mail application. Accordingly, structures and devices shown below in block diagram are illustrative of specific embodiments of the present disclosure and are meant to avoid obscuring the present disclosure.

Reference in the specification to "one embodiment," "this embodiment" or "an embodiment" means that a particular feature, structure, characteristic, or function described in connection with the embodiment is included in at least one embodiment disclosed in the present disclosure. The appearances of the phrase "in one embodiment" or "in an embodiment" in various places in the specification are not necessarily all referring to the same embodiment.

Figure 1:
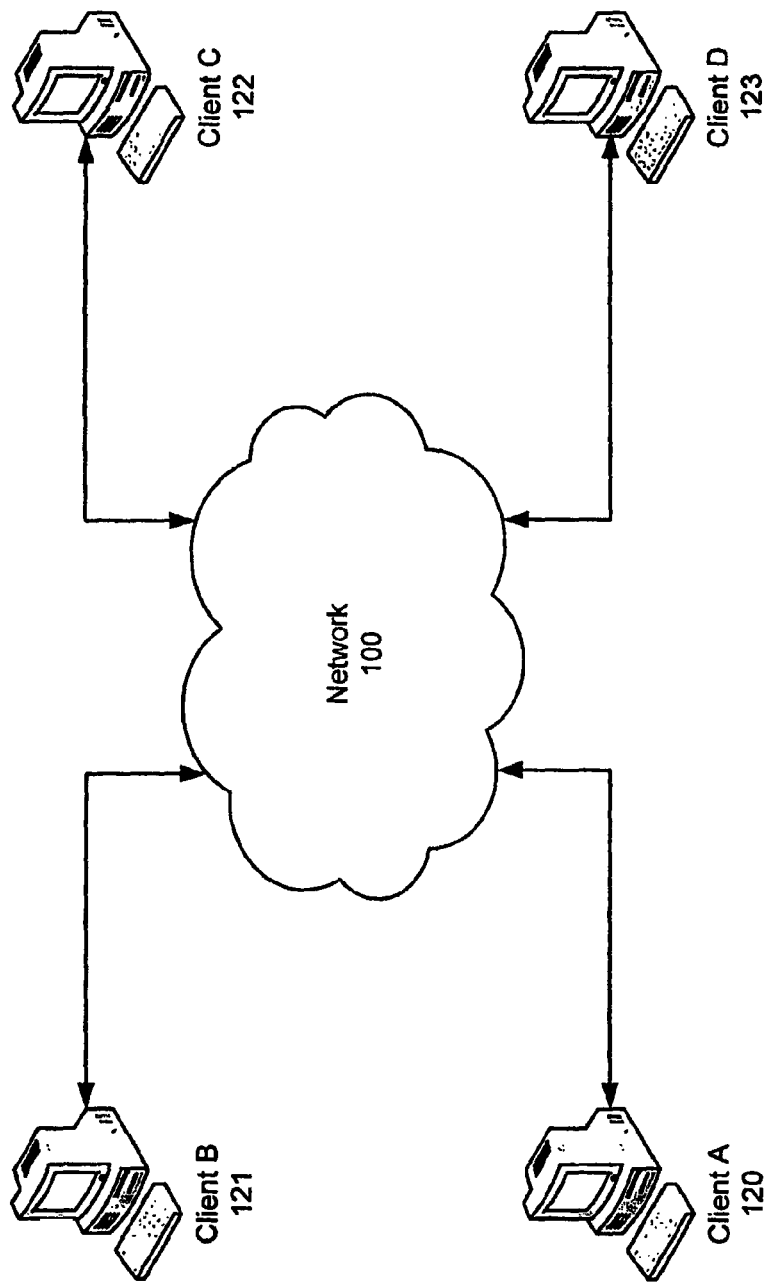
FIG. 1 illustrates an exemplary block diagram of a network on which email messages may be transmitted.
Figure 2A:
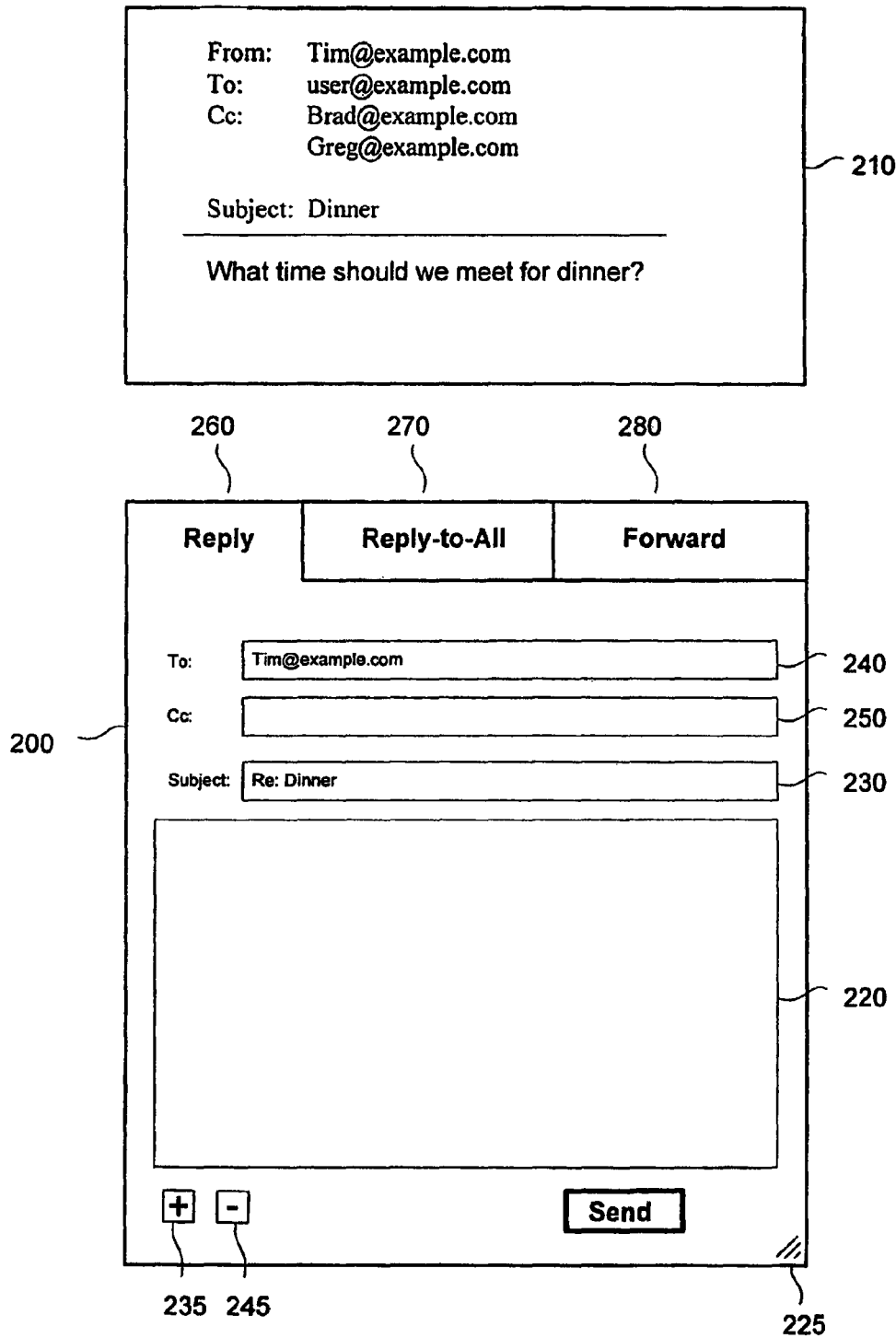
FIG. 2A illustrates a reply form 200 according to one embodiment of the present disclosure.

FIG. 2A illustrates an exemplary reply form 200 according to one embodiment of the present disclosure. Reply form 200 may provide an interface for the user to respond to a previously received email message 210. Reply form 200 may be located within the same window or document (e.g. web page) as the received email message. Reply form 200 may include a content area, such as text box 220, for typing or otherwise inputting the response message, a subject box 230 for entering a subject for the response message, and one or more recipient address boxes for inserting the email addresses of the recipients to which the user wishes to send the response message. In the embodiment illustrated in FIG. 2A, reply form 200 may include two recipient address boxes, 240 and 250. Reply form 200 may also include resize options that allow the user to dynamically resize reply form 200 or text box 220. In one embodiment, resize buttons 235 and 245 may be selected by the user to increase or reduce the number of lines of text available in reply form 200 or text box 220. Software code may detect a user selection of resize button 235 or 245 and may dynamically add or subtract a predefined number of lines of text from text box 220 within reply form 200. Alternatively, a control corner 225 may be provided to the user which the user may select and drag across the screen to increase the size of reply form 200 or text box 220. Reply form 200 may also include multiple response options. In one embodiment, reply form 200 may include three response options, Reply 260, Reply-to-All 270 and Forward 280.

In one embodiment, email message 210 is the message the user is responding to using reply form 200. As illustrated in FIG. 2A, email message 210 was sent to the user from Tim@example.com. In addition, Tim copied, denoted by "Cc:" Brad@example.com and Greg@example.com. Thus, Brad, Greg and the user each received a copy of email message 210.

Reply form 200 may be generated to allow the user to respond to email message 210 and may be displayed in the same window or document (e.g. web page) as email message 210. In an alternative embodiment, reply form 200 may be displayed in a separate window or frame from email address 210. In one embodiment, illustrated in FIG. 2B, a minimized reply form 215 may be inserted below email message 210. Minimized reply form 215 may include response options 260, 270 and 280 as discussed herein along with a small text box 217. In response to a user selection of one of the response options or in response to a user click in the text box 217, software code may detect the user selection or click and dynamically insert reply form 200 and/or an expanded text box 220 in place of minimized reply form 215 with minimized text box 217. In yet another embodiment, the software may expand the minimized reply form 215 by dynamically inserting additional lines into the text box 217 of minimized reply form 215.

In the embodiment illustrated in FIG. 2A, response options 260, 270 and 280 may be presented as virtual tabs or links so that the user may toggle between response options. As a user toggles through these tabs, a client computer may not be required to make a server request in response to the user selecting these tabs. Rather, software (such as javascript) may be provided on the client computer that detects the user selection of one of the tabs and populates address boxes 240 and/or 250 with the addresses corresponding to the selected response option. Thus, the user may type or enter a response to the email message 210 and define the characteristics of the response, such as the recipients of the response, without making a specific server request for the response or a response form. This reduction in client-server communication may provide a more efficient email platform in which latency, which is typically caused by generating an email response window and populating the corresponding recipient address field, may be reduced.

Software located on the client computer may also provide a more efficient email response mechanism for the user by allowing the user to toggle through the virtual tabs while maintaining content within the text box 220. For example, the user may initially select the Reply tab 260 and enter a response to the email message 210 within the text box 220. Thereafter, the user may toggle from the Reply tab 260 to the Reply-to-All tab 270. The content within the text box 220 may remain after this toggle without any user action. According to one embodiment, software on the client computer modifies the characteristics of the email response (i.e., changes from Reply response to Reply-to-All response) without erasing or modifying the content with the email response.

In the example illustrated in FIG. 2A, Reply 260 is the selected response option. In one embodiment, Reply 260 is the default response option displayed to the user.

In one embodiment, Reply option 260 may be defined to reply to the sender of the original email message 210. In the embodiment illustrated in FIG. 2A, Tim@example.com sent the email message 210 to which the user is responding so his email address is included in recipient address box 240 since the Reply 260 option is selected. In comparison, the response message will not be sent to Brad@example.com or Greg@example.com because they were not the original sender of email message 210 and thus are not associated with the Reply 260 option.

Figure 2B:
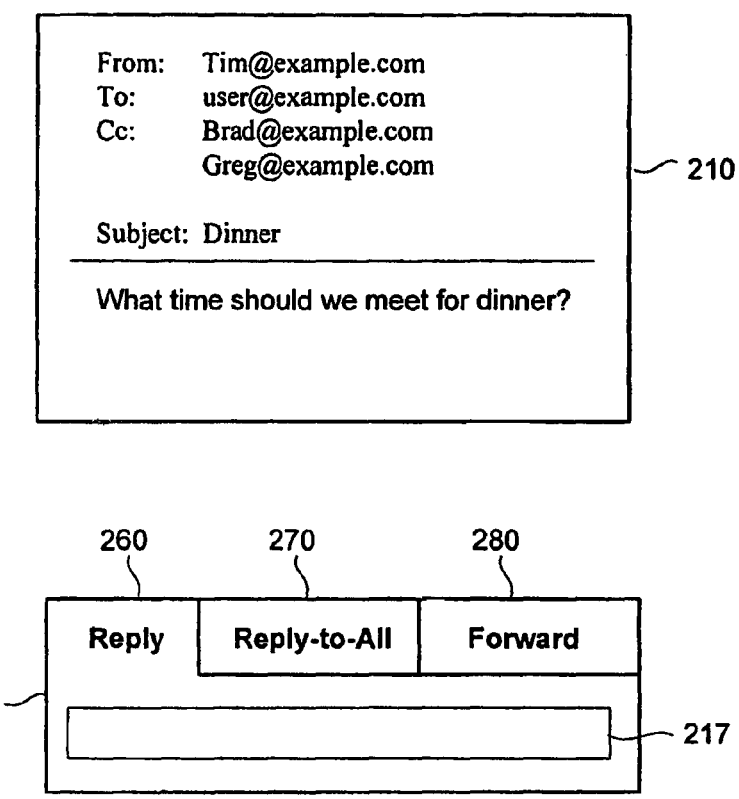
FIG. 2B illustrates a minimized reply form 215 according to one embodiment of the present disclosure.
Figure 2C:
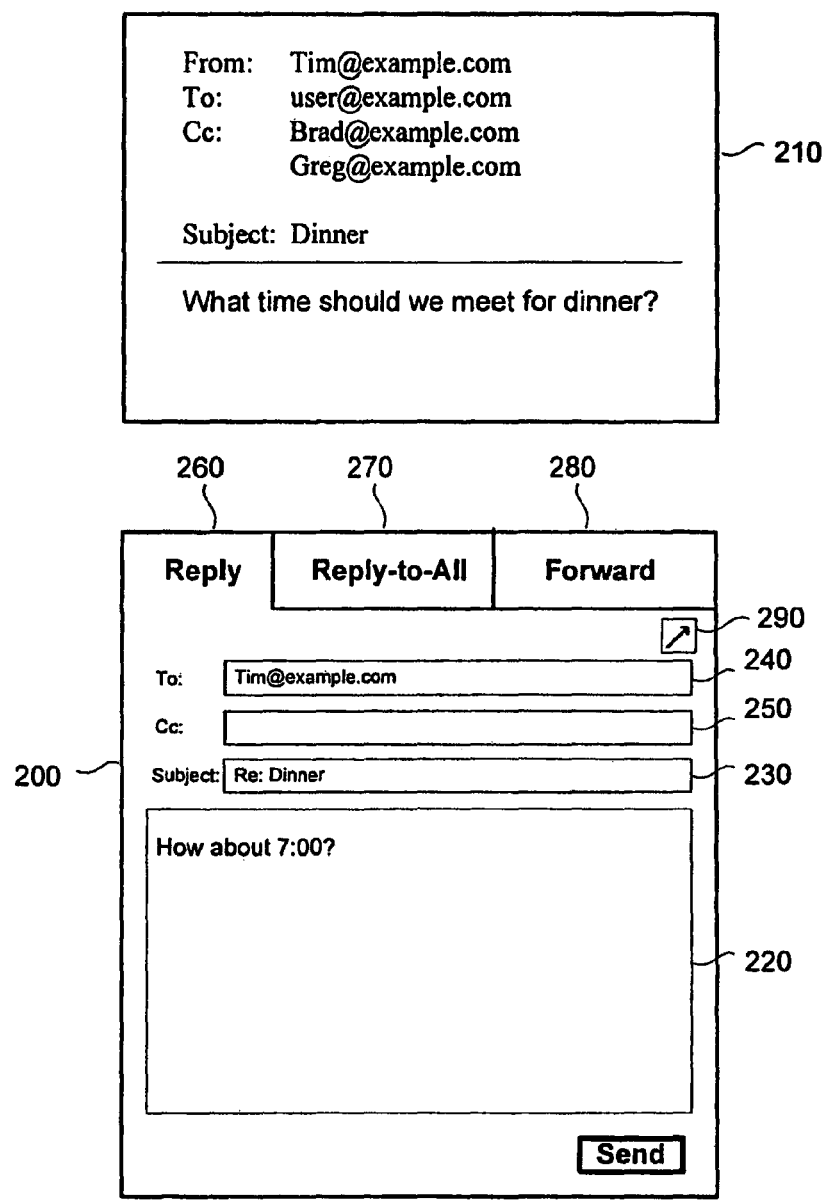
FIG. 2C illustrates a reply form 200 with a response message according to one embodiment of the present disclosure.

In one embodiment, the user may input a response message in text box 220 by clicking text box 220 and inputting the text through a keyboard or other input device. FIG. 2C, illustrates reply form 200 with a response message in text box 220. The response message in text box 220 may not be affected if the user toggles between the various response options.

As mentioned above, the user may toggle between the various response options in order to change the recipient addresses for the response message. For example, if the user wishes to send the message to Tim, Greg and Brad, the user may select the Reply-to-All option 270 within reply form 200. In one embodiment, Reply-to-All option 270 is defined to send the response message to all of the recipients of email message 210.

When the user selects Reply-to-All option 270, software code may detect the selection and dynamically update address boxes 240 and 250 to include the email addresses of the recipients associated with the selected response option. In this example, the software code may populate recipient address box 240 with Tim@example.com and may populate address box 250 with Greg@example.com and Brad@example.com. Each of these email addresses is associated with the Reply-to-All 270 option since it is defined to respond to each recipient of email message 210. In one embodiment, the software code may be embedded within the source code that defines reply form 200. In an alternative embodiment, the software code may be embedded within a hidden frame or second window (not shown in FIG. 2A).

The software code may be configured to monitor and/or receive data regarding user selections within reply form 200. In one embodiment, the software code may parse email message 210 to identify the various recipient email addresses. Based on the location within the email message 210 header, the software code may identify which email addresses to associate with each response option. For example, while parsing email message 210, the software code may identify email addresses located in the "Cc:" field and may assign these addresses to the Reply-to-All option 270. As a result, when a user selects Reply-to-All 270, the software code may populate recipient address box 250 of reply form 200 with the recipient email addresses parsed from the "Cc:" field of email message 210.

In another embodiment, while parsing email message 210, the software code may identify the email addresses located in the "From:" field of email message 210. The software code may associate these email addresses with the Reply 260 and Reply-to-All 270 options. The "From:" field email addresses may be associated with each response option since both are defined to respond to the sender of the original email message 210. As a result, when the user selects either of these response options, the software code may populate recipient text box 240 of reply form 200 with the email addresses parsed from the "From:" field of email message 210.

One skilled in the art will recognize that there are a number of ways to implement the software code described above. In one embodiment, JavaScript or another scripting language may be used to implement the present disclosure. In one embodiment, the software code may be embedded within the source code that defines reply form 200. In an alternative embodiment, the software code may be embedded within a hidden frame or second window.

Figure 2D:
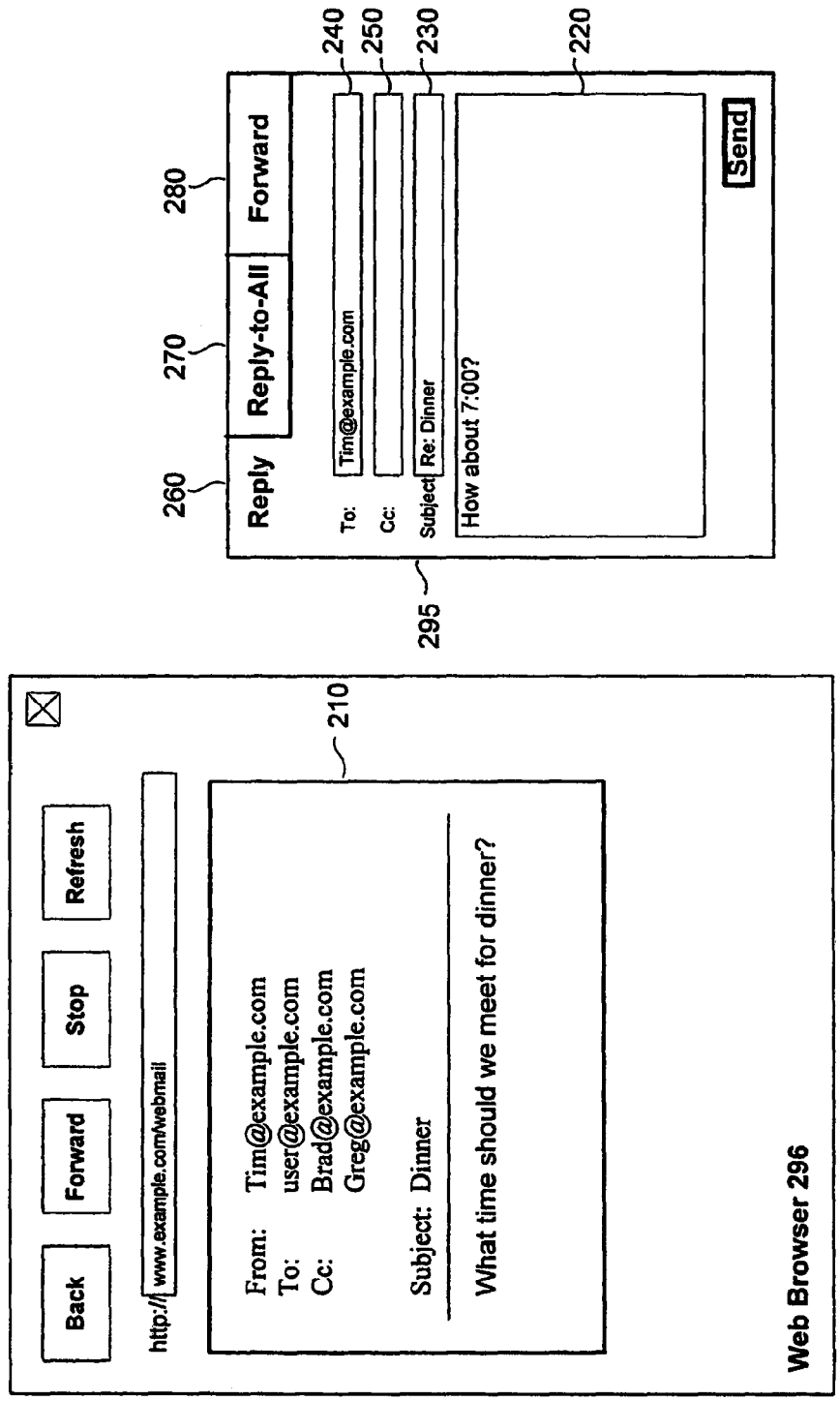
FIG. 2D illustrates a reply form 295 that has been torn away from the window displaying the original email message.

In one embodiment of the present disclosure illustrated in FIG. 2C, a tear off link or button 290 may be included with reply form 200. When a user clicks or otherwise selects tear off button 290, reply form 200 may be torn off of its original display in the same window as email message 210 and displayed in a separate window. FIG. 2D illustrates reply form 295 displayed in a window separate from email message 210. In one embodiment, email message 210 may still be displayed in the original window located within web browser 296. This embodiment of the present disclosure is advantageous because it allows the user to input a response message into reply form 295 while being able to navigate the web browser to a new web page. In another embodiment, when reply form 200 is torn away from the original display window, a new reply form 200 may be inserted below email message 210, allowing the user to draft a second response message separate from the response message being input into the reply form 295 that was torn away from the original display window.

Figure 3A:
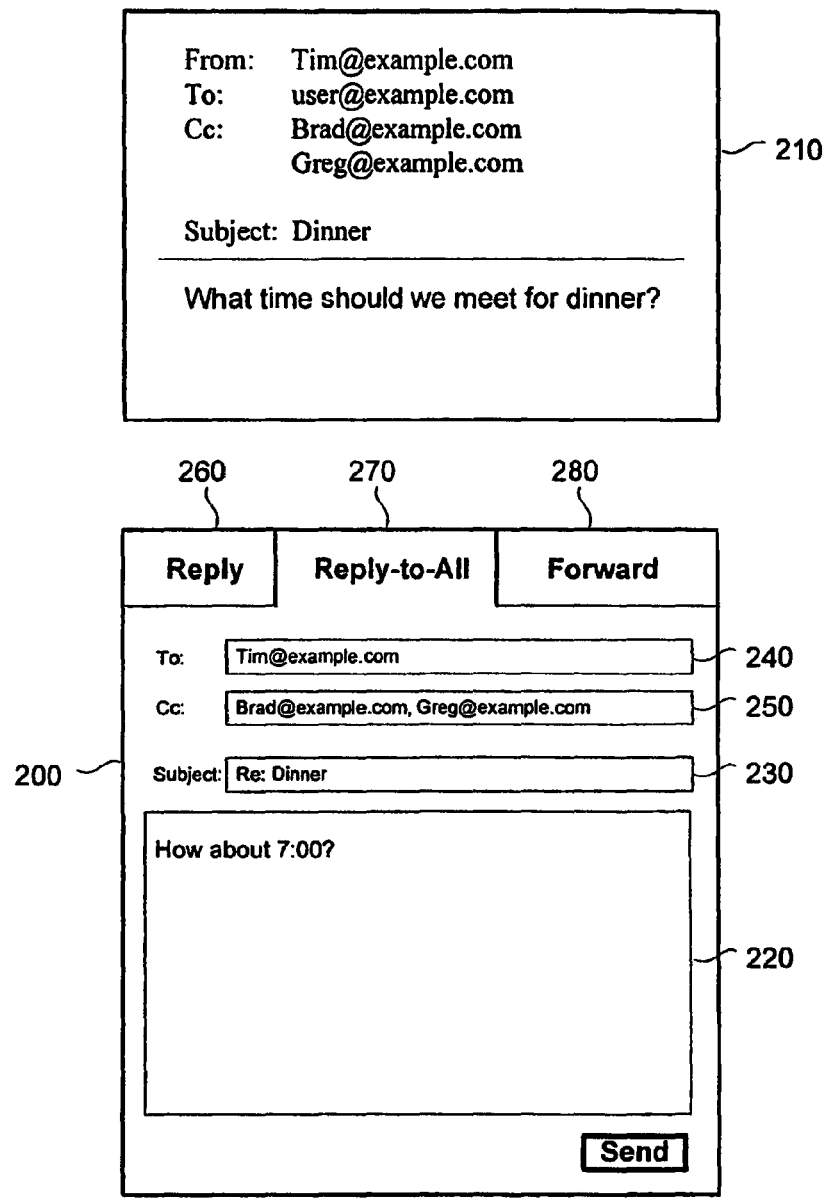
FIG. 3A illustrates a reply form 200 wherein the recipient addresses have been updated in response to a selection of a response option according to one embodiment of the present disclosure.

FIG. 3A illustrates reply form 200 with the recipient addresses updated in response to the user selection of the Reply-to-All 270 option according to one embodiment of the present disclosure. As discussed above, the Reply-to-All 270 option may be defined to send the reply message input into reply form 200 to all of the recipients of email message 210. In the example illustrated, the recipients associated with Reply-to-All option include Tim@example.com, Brad@example.com and Greg@example.com. When the Reply-to-All option 270 was selected by the user, the software code dynamically updated address boxes 240 and 250 with the recipient addresses associated with Reply-to-All option 270.

In one embodiment of the present disclosure, the user may click or otherwise select Send button 290 to send the message input to reply form 200 to the recipients specified in address boxes 240 and 250. In one embodiment, software code may detect the user selection of the send button and initiate the transfer of the message to a remote server for delivery to the specified recipients. In one embodiment, the software code may be embedded within the source code that defines reply form 200. In an alternative embodiment, the software code may be embedded within a hidden frame or second window. In one embodiment, the message may be sent without navigating the user to another web page. In other words, during the process of toggling between response options and sending the message, the same reply form 200 may be displayed to the user.

Figure 3B:
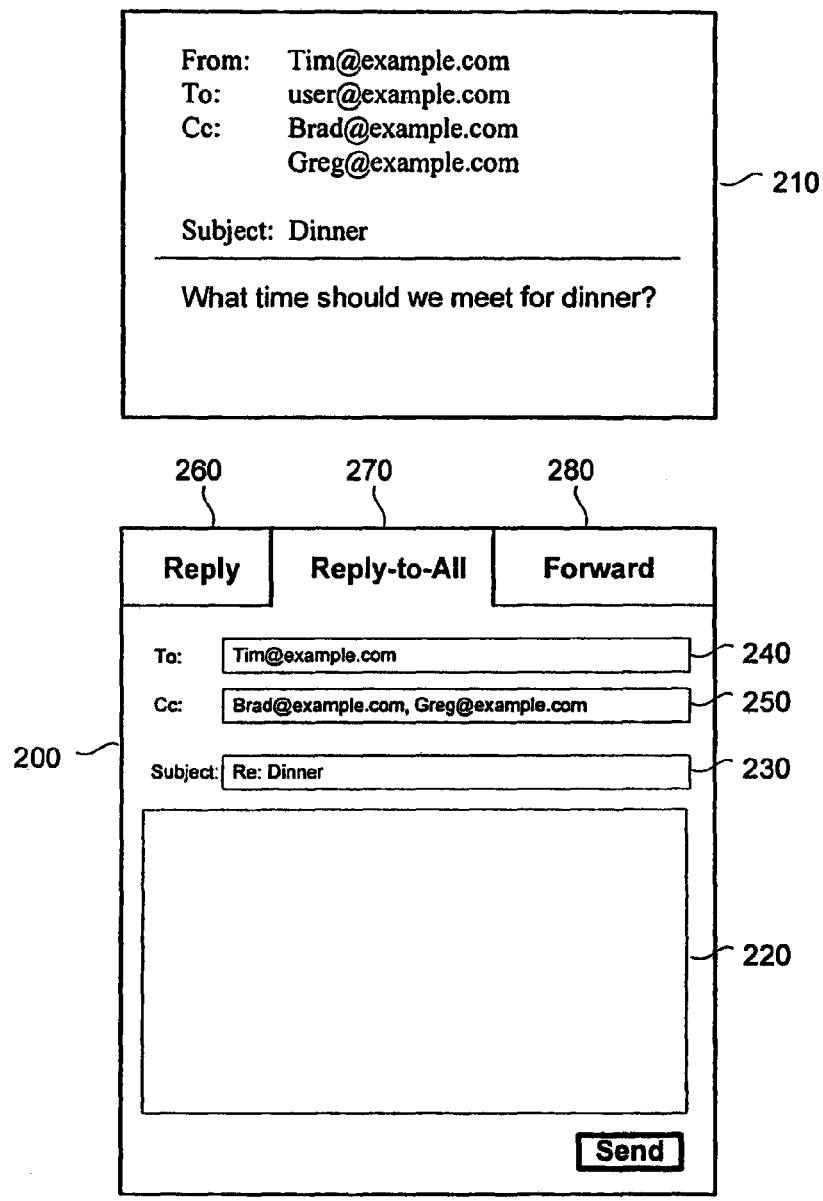
FIG. 3B illustrates a reply form 200 following the sending of a response message according to one embodiment of the present disclosure.

In one embodiment of the present disclosure, a confirmation message indicating that the message has been sent may be inserted in place of the reply form when the message has been sent. In another embodiment, the software code may be configured to remove the contents of text box 220 after the user has clicked on the send button and the message delivery has been initiated. As illustrated in FIG. 3B, the same reply form 200 may be displayed to the user with the contents of the text box deleted. As a result, the user may immediately begin creating a second response email. In one embodiment, reply form 200 maintains the same response option as the previously sent response message. In the example illustrated, the Reply-to-All 270 option remains the selected response option. In an alternative embodiment, reply form 200 may automatically toggle back to the default Reply option 260 after a response message has been sent. In either case, the user may again toggle between the various response options by simply selecting one of the other response options.

Figure 4A:
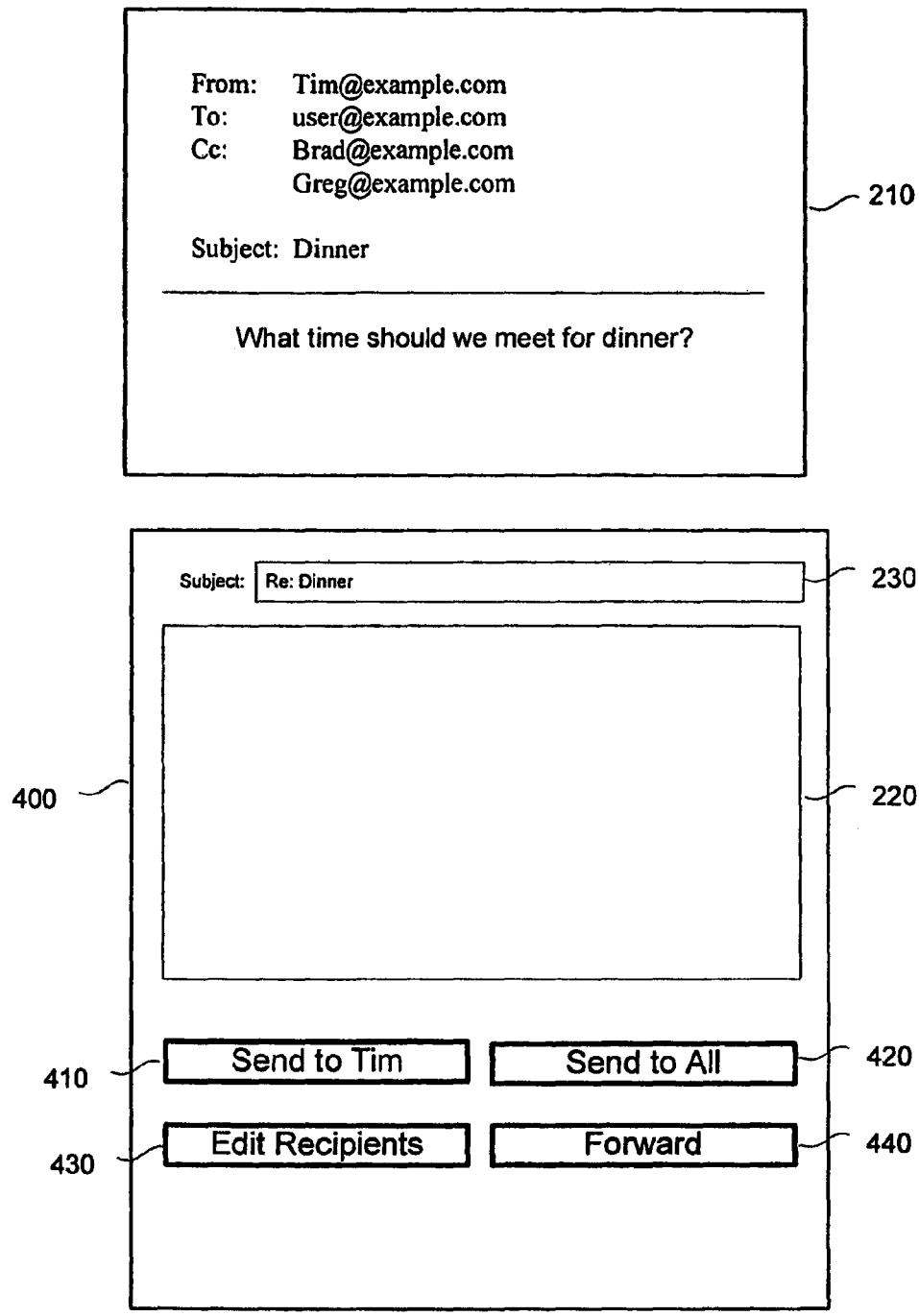
FIG. 4A illustrates a reply form 400 with response buttons according to one embodiment of the present disclosure.

One skilled in the art will recognize that the present disclosure is not limited to virtual tabs and that there are a number of other ways to display response options 260, 270 and 280 to a user, including but not limited to links and buttons. In one embodiment, illustrated in FIG. 4, a reply form 400 may be provided to a user with multiple response options provided to the user as a plurality of response buttons 410, 420, 430 and 440 that also initiate the sending of the message. Reply form 400 may include a subject box 230 and a text box 220 for inputting a response message.

In one embodiment, response button 410 may represent the reply option. When the user selects response button 410, software code may initiate the sending of the message input into text box 220 to the sender of the original message 210. In this example, Tim@example.com. Response button 420 may represent the reply-to-all option. When the user selects response button 420, software code may initiate the sending of the message input into text box 220 to all of the recipients of the original message 210. In this example, the message would be sent to Tim@example.com, Brad@example.com and Greg@example.com.

Figure 4B:
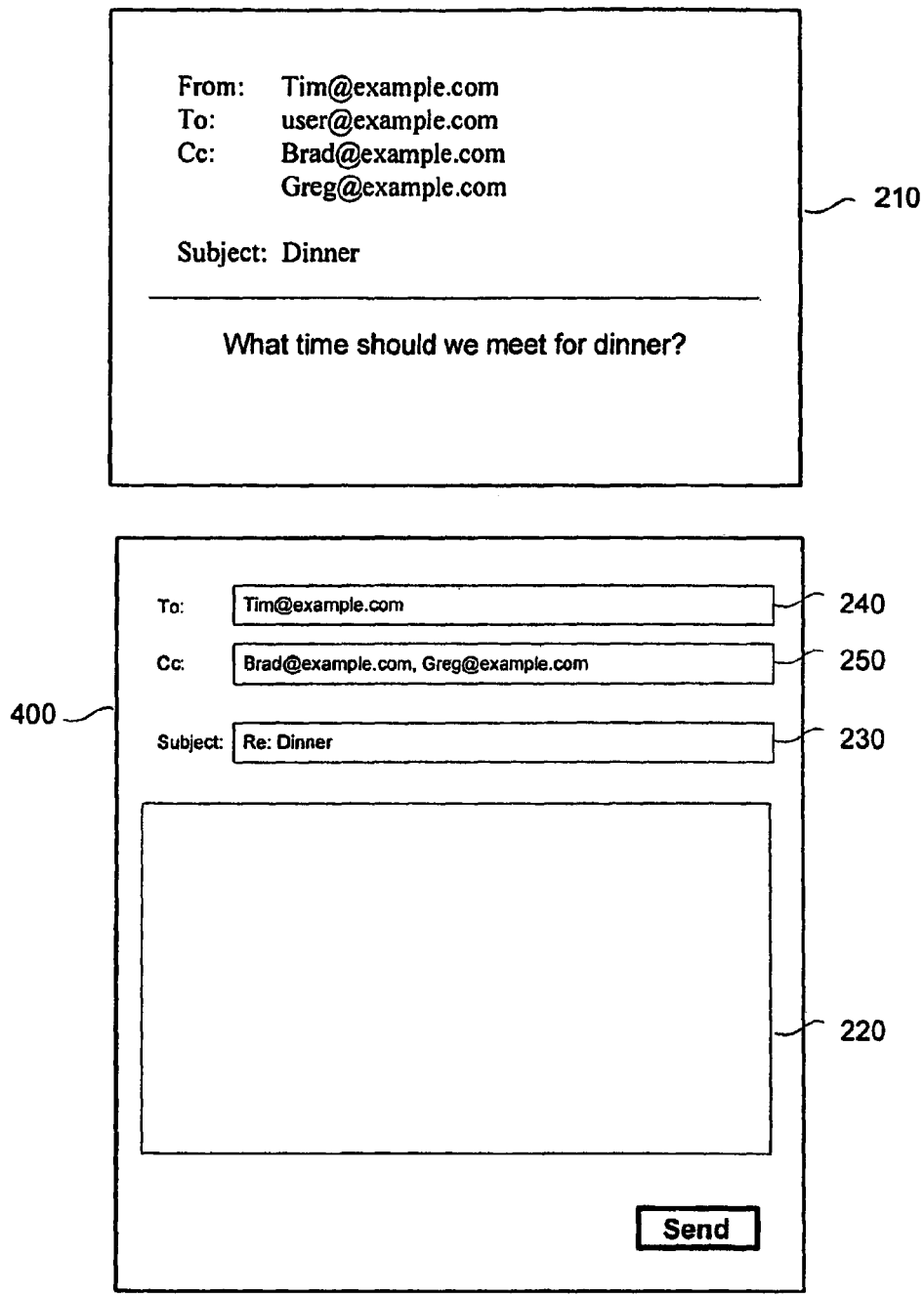
FIG. 4B illustrates a reply form according to one embodiment of the present disclosure.

In yet another embodiment, when the user selects the Edit Recipients response button 430, software code may dynamically insert the To: and Cc: address boxes 240 and 250 into reply form 400 along with a Send button as illustrated in FIG. 4B. In one embodiment, address boxes 240 and 250 may be populated with the recipient addresses associated with a reply-to-all option. The user may edit the addresses, add new addresses or delete one or more addresses from address boxes 240 and 250.

Similarly, when the user selects the Forward response button 440, software code may insert the To: and Cc: address boxes 240 and 250 into reply form 200 along with a Send button as illustrated in FIG. 4B. However, in this embodiment, address boxes 240 and 250 may be left empty, allowing the user to input the intended recipients. The software code may also include the text of the original message 210 in text box 220 along with a forward header. The forward header may include information identifying the sender of message 210, the date message 210 was sent, the subject of message 210 and the recipients of message 210.

Figure 5:
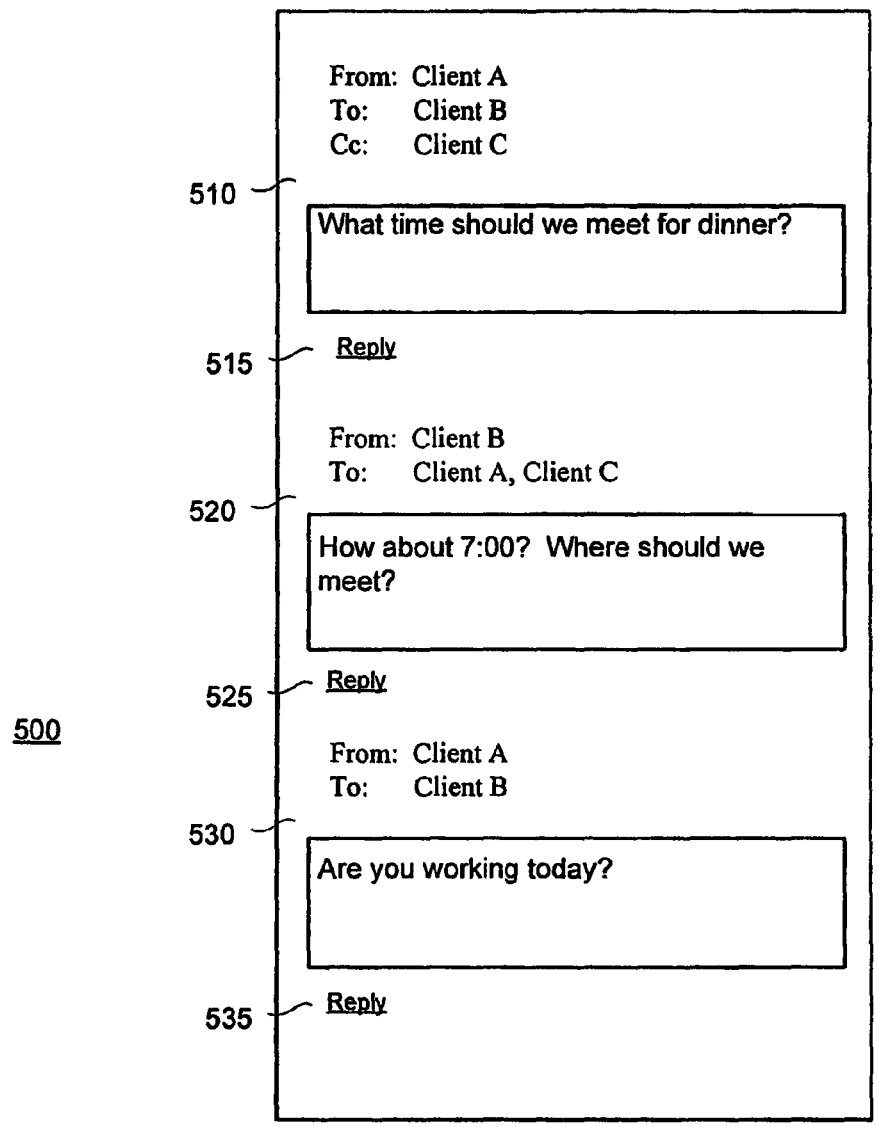
FIG. 5 illustrates an email thread 500 according to one embodiment of the present disclosure.

FIG. 5 illustrates multiple email messages 510, 520 and 530 that make up an email thread 500. Below each email message 510, 520 and 530 is a reply link 515, 525 and 535, respectively. In one embodiment of the present disclosure, a reply mechanism such as a reply link or other selection means may be associated with each email message that makes up email thread 500. The user may select one of the reply mechanisms to respond to the associated email message within email thread 500. In the embodiment illustrated in FIG. 5, reply links 515, 525 or 535 are provided to respond to the email message associated with the reply link. Software code may detect a user selection of the reply link and insert a reply form 200 below the message to which the user wants to respond. In one embodiment, the software code may be embedded within the source code that defines email thread 500. In an alternative embodiment, the software code may be embedded within a hidden frame or second window within the web browser.

Figure 6A:
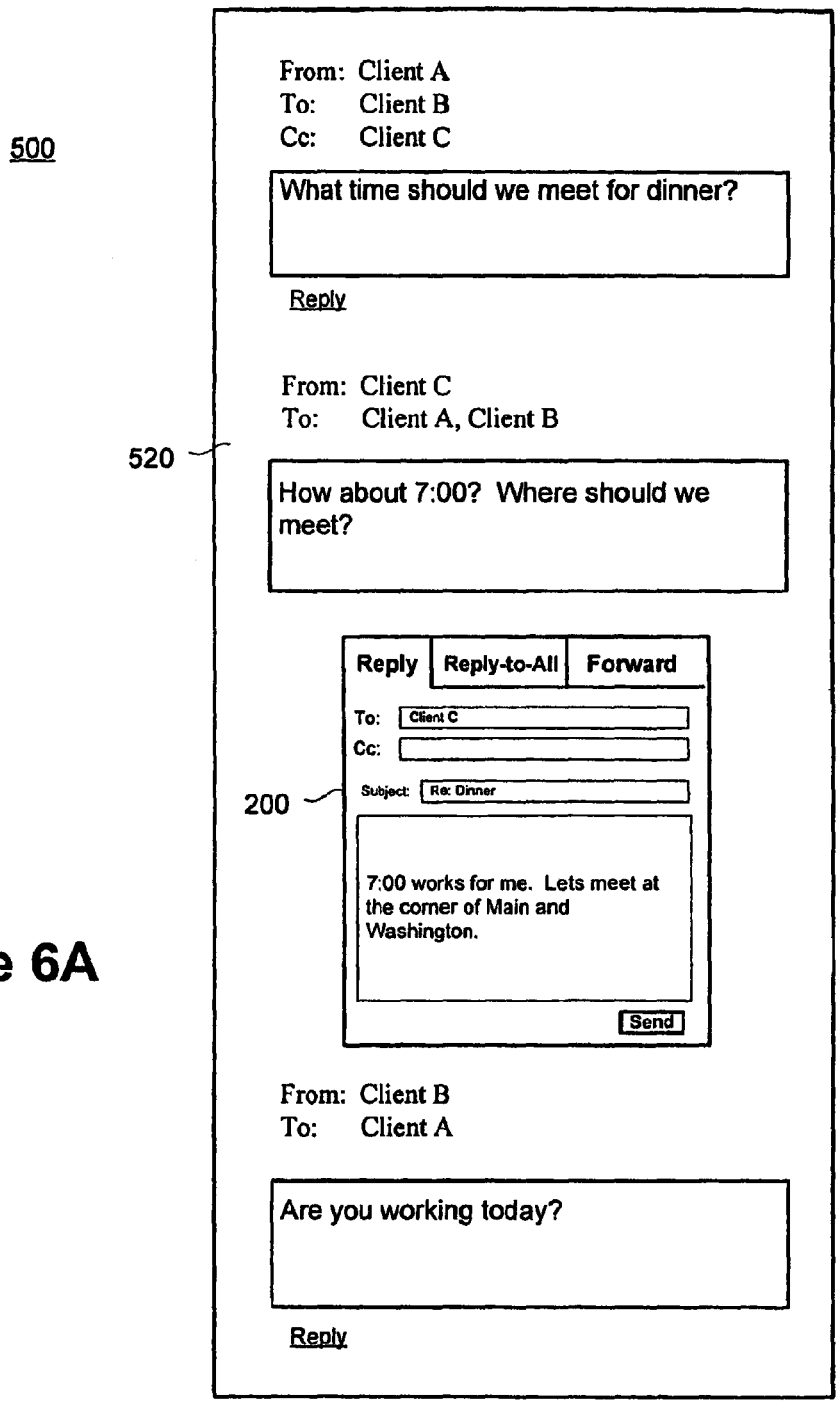
FIG. 6A illustrates an email thread 500 with a dynamically inserted reply form 200 according to one embodiment of the present disclosure.

In another embodiment, when a user selects reply link 525 a reply form 200 is inserted below email message 520 as illustrated in FIG. 6A. In yet another embodiment of the present disclosure, the user may click on multiple reply links 515, 525 and/or 535 to open multiple reply forms. As a result, the user may simultaneously input responses to multiple messages at the same time.

In a further embodiment of the present disclosure, a reply link may be provided for each response option supported. For example, a reply link may be provided for Reply 260 option, Reply-to-All 270 option and Forward 280 option. When the user selects one of the response options, a reply form 200 may be dynamically inserted below the email message associated with the reply link. Software code may populate address boxes 240 and 250 based on the selected response option. In addition, the user may still toggle between the response options within reply form 200 as described above.

In an alternative embodiment, the reply links located below each email message within email thread 500 may be replaced with minimized reply forms 215 illustrated in FIG. 2B. As discussed above, in response to a user selection of one of the response options or in response to a user click in the text box of minimized reply form 215, software code may detect the user selection or click and dynamically insert reply form 200 and/or an expanded text box 220 in place of minimized reply form 215 with minimized text box 217. In yet another embodiment, the software may expand the minimized reply form 215 by dynamically inserting additional lines into the text box 217 of minimized reply form 215. The user may select multiple minimized reply forms 215 within email thread 500, allowing the user respond to multiple email messages within email thread 500 at the same time.

In one embodiment of the present disclosure illustrated in FIG. 6B, when a user selects the send button within reply form 200 of email thread 500, the text of the reply message may be inserted into the thread view. As illustrated in this embodiment, the messages within thread 500 may be indented or otherwise distinguished to provide the user with a visual representation of each message within email thread 500.

FIG. 7 illustrates a method 700 for updating the recipient addresses of a response email in response to user selection of a response option according to one embodiment of the present disclosure. In step 710, a reply form for responding to a first electronic mail (email) message may be provided to a user. The reply form may include a text box for inputting the response message and one or more address boxes for inputting the addresses of the intended recipients of the response message.

In step 720, a plurality of response options may be provided to the user. The response options may be part of the reply form or may in some way be associated with the reply form. In one embodiment, the response options include the Reply option, the Reply-to-All option, and the Forward option. There are a number of ways in which the response options may be presented to the user, including presenting the response options as virtual tabs, links and or buttons. Each response option may be associated with a subset of the recipients of the email message to which the user is responding.

In step 730, a user selection of one of the plurality of response options may be detected. In one embodiment, software code detects the selection of one of the response options. The software code may determine which recipient addresses are associated with the selected response option. In one embodiment, the first email message may be parsed to locate the various recipients and sender of the first email message. These email addresses may be associated with various response options.

In step 740, the recipient addresses of the response message are updated in response to the selected response option. In one embodiment, software code may dynamically update or replace the recipient email addresses of the reply form with the recipient addresses associated with the selected response option. This may consist of removing email addresses from the reply form that are not associated with the selected response option. This may also consist of populating the reply form with recipient email addresses that are associated with the selected response option.

While the present disclosure has been described with reference to certain embodiments, those skilled in the art will recognize that various modifications may be provided. For example, though the present disclosure has been discussed with reference to various response options, one skilled in the art will recognize that the present disclosure is not limited to these response options. Other response options may be defined that are part of the present disclosure. In addition, there are numerous programming languages, including JavaScript, which may be used to implement the disclosure. Variations upon and modifications to the embodiments are provided for by the present disclosure, which is limited only by the following claims.

What is claimed is:

1. A method, comprising:
at a computer:
displaying a web mail reply form that includes a plurality of address fields, an input area for a reply message, and a plurality of response options selectable by a user, wherein each respective response option in the plurality of displayed response options is independently associated with a respective set of recipient addresses for reply messages;
receiving user selection of a first response option of the plurality of displayed response options;
in response to receiving user selection of the first response option, displaying the respective set of recipient addresses in the address fields, wherein the respective set of recipient addresses corresponds to the first response option;
while maintaining display of the plurality of response options:
receiving user input in the input area to create a reply message;
receiving user input to select a second response option of the plurality of response options, wherein the second response option is distinct from the first response option; and
in response to the user selection of the second response option, updating at least one of the recipient addresses in the address fields according to the respective set of recipient addresses corresponding to the second response option while maintaining display of the reply message in the input area;
receiving user input on the web mail reply form to send the reply message; and
in response to receiving the user input on the web mail reply form to send the reply message:
sending the reply message to the recipients identified in the address fields;
deleting the reply message from the input area; and
continuing to display the web mail reply form using the second response option, including displaying the respective set of recipient addresses corresponding to the second response option.

2. The method of claim 1, wherein the first response option and the second response option are selected from the group consisting of: reply, reply to all, and forward.

3. The method of claim 1, further comprising:
displaying a tear-off mechanism; and
responsive to a user selection of the tear-off mechanism:
displaying a second reply form separately from the first reply form;
wherein the second reply form includes:
the plurality of response options; and
the reply message.

4. The method of claim 3, wherein the second reply form further includes:
an option to edit a recipient address associated with a response option, in the plurality of response options, for the reply message.

5. The method of claim 1, wherein displaying the web mail reply form comprises:
displaying a plurality of email messages in an email thread as a list, each email message having a respective reply link;
receiving user selection of a first reply link corresponding to a first email message of the plurality of email messages; and in response to receiving user selection of a first reply link, displaying the web mail reply form in-line in the list below the first email message.

6. A computer system having one or more processors, memory storing one or more programs configured for execution by the one or more processors, and a display device, wherein the display device displays a graphical user interface, the one or more programs comprising instructions for:

displaying a web mail reply form that includes a plurality of address fields, an input area for a reply message, and a plurality of response options selectable by a user, wherein each respective response option in the plurality of displayed response options is independently associated with a respective set of recipient addresses for reply messages;

receiving user selection of a first response option of the plurality of displayed response options;

in response to receiving user selection of the first response option, displaying the respective set of recipient addresses in the address fields, wherein the respective set of recipient addresses corresponds to the first response option;

while maintaining display of the plurality of response options:

receiving user input in the input area to create a reply message;

receiving user input to select a second response option of the plurality of response options, wherein the second response option is distinct from the first response option; and in response to the user selection of the second response option, updating at least one of the recipient addresses in the address fields according to the respective set of recipient addresses corresponding to the second response option while maintaining display of the reply message in the input area;

receiving user input on the web mail reply form to send the reply message; and in response to receiving the user input on the web mail reply form to send the reply message:

sending the reply message to the recipients identified in the address fields;

deleting the reply message from the input area; and continuing to display the web mail reply form using the second response option, including displaying the respective set of recipient addresses corresponding to the second response option.

7. The computer system of claim 6, wherein the first response option and the second response option are selected from the group consisting of: reply, reply to all, and forward.

8. The computer system of claim 6, further comprising:

a tear-off mechanism, wherein, responsive to a user selection of the tear-off mechanism:

a second reply form separately from the first reply form is displayed; and wherein the second reply form includes:

the plurality of response options; and the reply message.

9. The computer system of claim 8, wherein the second reply form further includes:

an option to edit a corresponding recipient address for the reply message that is obtained from the first reply form.

10. The computer system of claim 6, wherein displaying the web mail reply form comprises:

displaying a plurality of email messages in an email thread as a list, each email message having a respective reply link;

receiving user selection of a first reply link corresponding to a first email message of the plurality of email messages; and in response to receiving user selection of a first reply link, displaying the web mail reply form in-line in the list below the first email message.

11. A non-transitory computer readable storage medium storing at least one program configured for execution by at least one processor of a computer system, the at least one program comprising instructions for:

displaying a web mail reply form that includes a plurality of address fields, an input area for a reply message, and a plurality of response options selectable by a user, wherein each respective response option in the plurality of displayed response options is independently associated with a respective set of recipient addresses for reply messages;

receiving user selection of a first response option of the plurality of displayed response options;

in response to receiving user selection of the first response option, displaying the respective set of recipient addresses in the address fields, wherein the respective set of recipient addresses corresponds to the first response option;

while maintaining display of the plurality of response options:

receiving user input in the input area to create a reply message;

receiving user input to select a second response option of the plurality of response options, wherein the second response option is distinct from the first response option; and in response to the user selection of the second response option, updating at least one of the recipient addresses in the address fields according to the respective set of recipient addresses corresponding to the second response option while maintaining display of the reply message in the input area;

receiving user input on the web mail reply form to send the reply message; and in response to receiving the user input on the web mail reply form to send the reply message:

sending the reply message to the recipients identified in the address fields;

deleting the reply message from the input area; and continuing to display the web mail reply form using the second response option, including displaying the respective set of recipient addresses corresponding to the second response option.

12. The computer readable storage medium of claim 11, wherein the first response option and the second response option are selected from the group consisting of: reply, reply to all, and forward.

13. The computer readable storage medium of claim 11, wherein the at least one program further comprising instructions for:

displaying a tear-off mechanism; and responsive to a user selection of the tear-off mechanism:

displaying a second reply form separately from the first reply form, wherein the second reply form includes:

the plurality of response options; and the reply message.

14. The computer readable storage medium of claim 11, wherein displaying the web mail reply form comprises:

displaying a plurality of email messages in an email thread as a list, each email message having a respective reply link;

receiving user selection of a first reply link corresponding to a first email message of the plurality of email messages; and in response to receiving user selection of a first reply link, displaying the web mail reply form in-line in the list below the first email message.

* * * * *